United States Patent [19]
Gatsis

[15] 3,635,838
[45] Jan. 18, 1972

[54] REGENERATION OF UNSUPPORTED VANADIUM SULFIDE CATALYST
[72] Inventor: John G. Gatsis, Des Plaines, Ill.
[73] Assignee: Universal Oil Products Company, Des Plaines, Ill.
[22] Filed: Feb. 2, 1970
[21] Appl. No.: 8,057

[52] U.S. Cl. ..................................252/415, 23/23, 23/29 V, 23/134, 23/138, 208/144, 208/213, 208/264, 252/411, 252/413, 252/416
[51] Int. Cl. ........................................B01j 11/76, B01j 11/02
[58] Field of Search ..................252/411, 413, 415; 208/264, 208/252, 215, 249; 23/134, 138, 29 V, 23

[56] References Cited

UNITED STATES PATENTS

| | | | |
|---|---|---|---|
| 2,038,599 | 4/1936 | Pier et al. | 23/134 |
| 2,370,707 | 3/1945 | Archibald | 252/411 R |
| 2,709,639 | 5/1955 | Folkins et al. | 252/411 S |
| 3,161,585 | 12/1964 | Gleim et al. | 208/264 |
| 3,165,463 | 1/1965 | Gleim et al. | 208/264 |

Primary Examiner—Daniel E. Wyman
Assistant Examiner—P. E. Konopka
Attorney—James R. Hoatson, Jr. and Robert W. Erickson

[57] ABSTRACT

A carbonized, unsupported nonstoichiometric vanadium sulfide catalyst is regenerated by way of a three-stage treatment at elevated temperatures. In the first stage, carbon is removed from the catalyst by contacting with elemental sulfur at an elevated temperature in the range of about 500° to about 1,000° C. The substantially carbon-free catalyst is treated with a mineral acid, or anhydrous HF, to dissolve metallic contaminants, and further treated in a third stage with elemental sulfur at a temperature in the range of 300° to about 500° C. to form vanadium tetrasulfide.

5 Claims, No Drawings

1

REGENERATION OF UNSUPPORTED VANADIUM SULFIDE CATALYST

APPLICABILITY OF INVENTION

The invention described herein encompasses a procedure for catalyst regeneration. The catalytic composites, to which my invention is specifically directed, are the metallic sulfides of the metals of group V of the periodic table. Furthermore, the metallic sulfide catalysts are unsupported, which term is intended to designate a catalyst, or catalytic component which is not an integral part of a composite with a refractory inorganic oxide carrier material. The regeneration procedure is particularly adaptable to the sulfides of the metals of group V, and especially vanadium.

The carbonized sulfides of the foregoing metals are those which have been employed in the slurry processing of asphaltene-containing hydrocarbonaceous material. This hydrocarbonaceous material, including atmospheric tower bottoms, vacuum tower bottoms, crude oil residuals, topped crude oils, coal oil extracts, crude oils extracted from tar sands, etc., are generally categorized in the art as "black oils."

Black oils contain high molecular weight sulfurous compounds in exceedingly large quantities. In addition, they contain excessive quantities of nitrogenous compounds, high molecular weight organometallic complexes principally comprising nickel and vanadium, and asphaltenic material. The asphaltenic material is generally found to be complexed with, or linked to sulfur, and, to a certain extent, with the organometallic contaminants. An abundant supply of such hydrocarbonaceous material exists, most of which have a gravity less than 20.0° API, and which is further characterized by a boiling range indicating that 10.0 percent by volume, and generally more has a normal boiling point of a temperature of about 1,050° F.

Difficulties encountered in processing black oils, utilizing a fixed bed of a supported catalyst, have indicated that a more advantageous route is a slurry process wherein an unsupported catalytic component is admixed with the charge stock. The principal difficulty with a fixed bed system is the lack of a technique which affords the catalytic composites sulfur stability in the presence of the asphaltenic and organometallic compounds. Not only does the catalyst deactivate rapidly, as a result of the formation of carbon, but the metallic contaminants become deposited upon the catalysts employed, steadily increasing in quantity until such time as the composition of the catalytic composite is changed to the extent that undesirable results are obtained. The asphaltenic fraction consists primarily of high molecular weight, nondistillable coke precursors, insoluble in light hydrocarbons such as propane, pentane, or heptane.

The primary purpose of the present invention is to provide an efficient and economical scheme for the regeneration of the carbonized, unsupported catalysts utilized in the slurry processing of hydrocarbonaceous black oils. As hereinbefore set forth, my invention is particularly directed toward the regeneration of an unsupported nonstoichiometric vanadium sulfide catalyst.

OBJECTS AND EMBODIMENTS

A principal object of my invention is to provide a method for the regeneration of a carbonized, unsupported catalyst. A corollary objective is to regenerate a carbonized, unsupported vanadium sulfide catalyst.

Another object of my invention is to afford a regeneration procedure which removes deposited metallic contaminants, from the charge stock, from a carbonized, unsupported vanadium sulfide catalyst.

Therefore, in one embodiment, my invention encompasses a method for regenerating a carbonized, metal-contaminated vanadium sulfide catalyst which comprises the steps of:

a. removing carbon from the vanadium sulfide catalyst;
b. treating the decarbonized catalyst with a mineral acid or anhydrous HF, thereby dissolving the metallic contaminants; and,
c. treating the vanadium catalyst with elemental sulfur at a temperature in the range of about 300° C. to about 500° C. to form vanadium tetrasulfide.

Other objects and embodiments of my invention, relating to particular regeneration conditions and techniques will become apparent from the following detailed summary of the invention.

SUMMARY OF INVENTION

Previous investigations into the slurry processing of hydrocarbonaceous black oils have indicated that the preferred unsupported catalytic component is a vanadium sulfide on nonstoichiometric sulfur content. Through the use of the term "unsupported," it is intended to designate a catalyst, or catalytic component which is not an integral part of a composite with a refractory inorganic oxide carrier material. That is, the catalyst is a vanadium sulfide without the addition thereto of extraneous material. Although the precise atomic ratio of sulfur to vanadium is not known with accuracy, X-ray analyses have indicated that the nonstoichiometric, catalytic sulfide has a ratio of sulfur to vanadium not less than 0.8:1, nor greater than 1.8:1. This is not intended to mean that the vanadium sulfide has but a single specific sulfur/vanadium atomic ratio, but rather refers to a mixture of vanadium sulfides having nonstoichiometric sulfur/vanadium atomic ratios within the aforesaid range. Although four oxidation states are known for vanadium, 2, 3, 4 and 5, *Periodic Table of the Elements*, E. H. Sargent & Company, 1964, only three stoichiometric vanadium sulfides are sufficiently stable for identification. These are: monovanadium sulfide, VS; sesquivanadium sulfide, $V_2S_3$; and, pentavanadium sulfide, $V_2S_5$; *Handbook of Chemistry and Physics*, Chemical Rubber Publishing Company, 42nd Edition, Pg. 680, 1960-1961. The literature is replete with references to many identifiable nonstoichiometric vanadium sulfides which are specific compounds in their own right, possibly the most common being the tetrasulfide, $VS_4$. It has previously been found that the catalytic vanadium sulfide is not identifiable as any of the stoichiometric vanadium sulfides, nor as $VS_4$. The catalytic, nonstoichiometric vanadium sulfide is, however, produced in the reaction zone in situ by the conversion of the tetrasulfide at reaction conditions.

The slurry-type conversion process is generally effected by commingling the charge stock/vanadium sulfide slurry with hydrogen in an amount of from about 5,000 to about 100,000 s.c.f./bbl. The hydrogen stream generally contains from 1.0 mol percent to about 20.0 mol percent of hydrogen sulfide. The slurry is introduced into a reaction zone, the inlet temperature generally being controlled at a minimal level of about 225° C., and at higher levels to the extent that the outlet temperature does not exceed about 500° C. The reaction chamber is generally maintained under an imposed pressure greater than about 500 p.s.i.g., and preferably at a level of from 1,500 to about 5,000 p.s.i.g. One particularly preferred technique is to introduce the slurry mixture into a lower portion of the reaction zone. This has the advantage that the extremely heavy portion of the charge stock will have an appreciably longer residence time within the reaction zone, with the result that a greater degree of conversion is attainable.

The reaction product effluent is subjected to a series of separation steps which result in an asphaltenic sludge containing carbonized vanadium sulfide having metallic impurities either deposited thereon, or agglomerated therewith. Since the sludge will contain distillable hydrocarbon products, it is treated, for example, by a series of filtration and solvent washing techniques. Suitable solvents include methyl naphthalene, carbon tetrachloride, benzene, toluene, etc. Carbon, coke and other carbonaceous material is removed from the catalyst by being admixed with elemental sulfur and heated to a temperature of about 500° C. to about 1,000° C., whereby carbon disulfide is formed and removed from the metal components in the vaporous state. When the metals are substantially free from the coke and other carbonaceous material, the temperature is lowered to a level within the range of from about 0° to about 100° C. At the lower temperature level, the metallic components are treated with a mineral acid such as sulfuric acid, hydrochloric acid, or hydrofluoric acid, or anhydrous HF. The vanadium sulfides, including $VS_4$, $V_2S_3$, $V_2S_5$, VS and the nonstoichiometric vanadium sulfides are resistant to such acids, whereas the metallic contaminants, whether as metals, sulfides or oxides will react with the acids to form volatile or water-soluble compounds. In addition to nickel, such other metallic contaminants include copper, lead, iron, magnesium, etc., and may exist as metal oxides, for example, silica or alumina, or as sulfides such as iron sulfide. Although there is no indication that these substances, in relatively minor amounts, are detrimental to the catalyst, they will continue to accumulate as the catalytic vanadium sulfide is recycled and eventually overpower the catalytic action. The acid-treated catalyst is subjected to a series of washing steps to remove traces of the acid, after which the metal components are dried.

In order to ensure that the vanadium exists in the sulfide form which converts to the nonstoichiometric catalytic vanadium sulfide within the reaction zone the dry component is treated with elemental sulfur, preferably in an atmosphere of hydrogen sulfide and/or carbon disulfide at a temperature in a range of about 250° C. to about 500° C. Traces of elemental sulfur are readily removed from the sulfide component through the use of carbon disulfide.

I claim as my invention:

1. A process for regenerating a carbonized, metal-contaminated unsupported vanadium sulfide catalyst which comprises the steps of:
   a. removing carbon from the vanadium sulfide catalyst by heating in contact with elemental sulfur;
   b. treating the decarbonized catalyst with a mineral acid or anhydrous HF, and dissolving metallic contaminants; and,
   c. treating the vanadium catalyst with elemental sulfur at a temperature in the range of 300° C. to about 500° C. to form vanadium tetrasulfide.

2. The process of claim 1 further characterized in that said mineral acid is sulfuric acid.

3. The process of claim 1 further characterized in that said mineral acid is hydrochloric acid.

4. The process of claim 1 further characterized in that said mineral acid is hydrofluoric acid.

5. The process of claim 1 further characterized in that said catalyst is decarbonized by heating in contact with elemental sulfur at a temperature in the range of 700° C. to about 1,000° C.

* * * * *